United States Patent [19]

Nuckolls et al.

[11] Patent Number: 4,866,347
[45] Date of Patent: Sep. 12, 1989

[54] COMPACT FLUORESCENT LAMP CIRCUIT

[75] Inventors: Joe A. Nuckolls, Blacksburg; Paul J. Buckley, II, Christiansburg, both of Va.

[73] Assignee: Hubbell Incorporated, Orange, Conn.

[21] Appl. No.: 102,001

[22] Filed: Sep. 28, 1987

[51] Int. Cl.$^4$ .................................. H05B 39/04
[52] U.S. Cl. ................................ 315/158; 315/156; 315/159; 315/104; 315/106; 315/107; 315/240; 315/277; 315/DIG. 7
[58] Field of Search .................. 315/101–107, 315/276, 277, 278, 239, 240, 219, 220, 221, DIG. 7, 151, 156, 158, 159

[56] References Cited

U.S. PATENT DOCUMENTS

| | | | |
|---|---|---|---|
| 3,476,976 | 11/1969 | Morita et al. | 315/101 |
| 3,626,243 | 12/1971 | Koyama et al. | 315/101 |
| 3,851,209 | 11/1974 | Murakami et al. | 315/99 |
| 3,917,976 | 11/1975 | Nuckolls | 315/258 |
| 3,963,958 | 6/1976 | Nuckolls | 315/276 |
| 4,209,730 | 6/1980 | Pasik | 315/290 |
| 4,380,719 | 4/1983 | De Bijl et al. | 315/101 |
| 4,460,848 | 6/1984 | Fähnrich et al. | 315/101 |
| 4,480,214 | 10/1984 | Sodini | 315/290 |
| 4,588,925 | 5/1986 | Fähnrich et al. | 315/101 |
| 4,629,944 | 12/1986 | Maytum et al. | 315/207 |
| 4,642,521 | 2/1987 | Smulders | 315/106 |
| 4,647,817 | 3/1987 | Fähnrich et al. | 315/104 |
| 4,749,909 | 7/1988 | Smulders | 315/101 |

FOREIGN PATENT DOCUMENTS 56-23559 6/1981 Japan ................................. 315/101

OTHER PUBLICATIONS

Shindengen Electric Mfg. Co., Ltd., "Pulse Generation SIDAC K1V", 1983 Cat. No. T2305.

Primary Examiner—David K. Moore
Assistant Examiner—Mark R. Powell
Attorney, Agent, or Firm—Jerry M. Presson; Walter C. Farley

[57] ABSTRACT

A starting and operating circuit for a super compact fluorescent lamp includes ballast and discharge circuits for applying current to the filaments of the lamp and then apply starting pulses which enable the lamp to commence operation. The circuits include discharge devices and assure operation and proper starting of the lamp under low temperature as well as moderate temperature conditions.

5 Claims, 1 Drawing Sheet

COMPACT FLUORESCENT LAMP CIRCUIT

This invention relates to starting and operating circuits for use with super compact fluorescent lamps and particularly to such circuits which are effective to start the lamps in cold temperature conditions.

BACKGROUND OF THE INVENTION

In the recent past, a new form of fluorescent lamp has been introduced in the market place and is known as a super compact fluorescent lamp. This type of lamp differs from the conventional lamp in having a "folded" kind of construction. Rather than having connectors at opposite ends of a tubular envelope, as has been customary with either the linear lamps or the U-shaped lamps, the super compact lamps have a single base which houses all of the electrical connections. In this respect, the super compact lamps resemble a more conventional incandescent lamp and can be used to replace incandescent and low wattage, high intensity discharge lamp fixtures in many circumstances.

At the present time, lamps are available in various sizes ranging from 10 to about 26 watts, the lamp having an outside length of from about 4.5 in. to about 7.5 in. measuring from the tip of the base to the tip of the glass envelope. These lamps produce light in the range of from about 600 to about 2000 lumens. The base is a plug-in base and the lamp has two filaments as do many of the better-known elongated tubular varieties. As will be recognized, the light output from these lamps makes them suitable for replacing incandescent lamps having up to about a 150 watt rating.

Although the super compact lamps have many characteristics in common with the tubular varieties, it has been found that there are also some significant operational differences. In particular, it has been found that the standard starters are not adequate to start the super compact lamps under low temperature conditions, particularly below 15° F., and that starting of the lamps was not reliable under a temperature of 35° F. Although the reason for this is not completely understood, it has been theorized that mercury ions within the lamp are condensed or frozen out of the gas because of the greater glass wall area, thereby increasing the lamp ignition peak voltage to a level at which the starter repeatedly attempts unsuccessfully to start the lamp, ultimately resulting in its self-destruction.

SUMMARY OF THE INVENTION

Accordingly, an object of the present invention is to provide starter circuits which are usable to effectively and reliably start super compact fluorescent lamps under low temperature environmental conditions.

As used herein, the expression "low temperature" is used to refer to any temperature at or below the freezing of water, although the circuits disclosed herein have been shown to be effective at temperatures as low as −65° F.

Briefly described, the invention includes a starting and operating circuit having a ballast reactor connectable to a source of line voltage and a super compact fluorescent lamp having two filaments, one terminal of each of the filaments being connected through the reactor to the source. A first circuit including a pulse transformer and a high frequency coupling capacitor is provided for furnishing starting pulses to the lamp, the pulse transformer circuit being connected to the other terminals of the lamp filaments. A second circuit, also connected between the other terminals of the filaments, includes a radio frequency (RF) choke, a charging resistor and a storage capacitor connected in series. A breakdown device is connected between the capacitor and the pulse transformer for providing a pulse to the transformer in response to the development of a trigger voltage on the storage capacitor. A positive temperature coefficient (PTC) resistor is connected in parallel with the charging resistor and storage capacitor. The PTC resistor has a cold resistance significantly less than that of the charging resistor and storage capacitor so that when energy is first supplied to the lamp and starting circuit and when current flows through the filaments, the choke and one of the parallel-connected circuits, substantially more current flows through the PTC resistor than through the charging resistor. The PTC resistor has a warm resistance significantly greater than the charging resistor so that when the PTC resistor and the filaments are warm, current is diverted into the charging resistor and capacitor, charging the capacitor to the trigger level and triggering the breakdown device to produce starting pulses for the lamp.

BRIEF DESCRIPTION OF THE DRAWING

In order to impart full understanding of the manner in which these and other objectives are attained in accordance with the invention, particularly advantageous embodiments thereof will be described with reference to the accompanying drawings, which form a part of this specification, and wherein.

DESCRIPTION OF THE PREFERRED EMBODIMENTS

Figure 1:
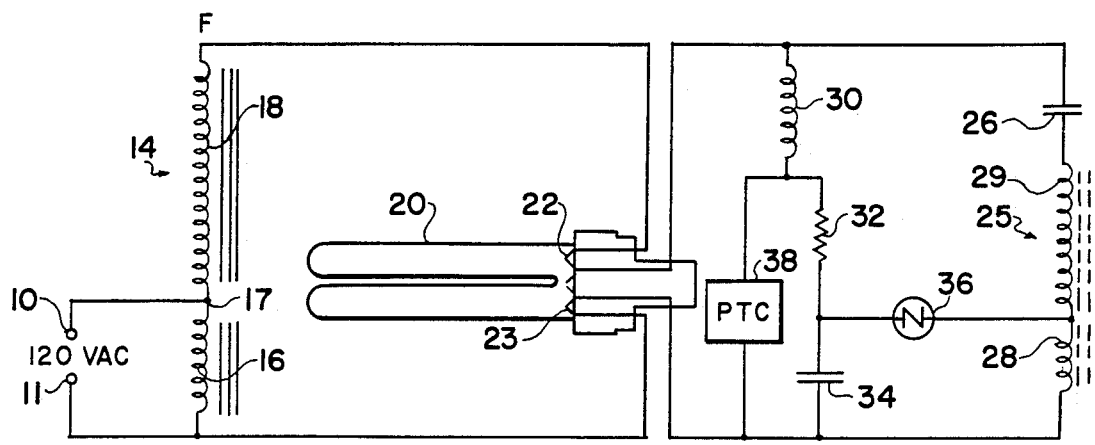
FIG. 1 is a schematic circuit diagram of a first embodiment of a starting and operating circuit in accordance with the invention.

Referring first to FIG. 1, the circuit includes terminals 10 and 11 which are connectable to a 120 volt AC line voltage source, these terminals being connected to a lag ballast indicated generally at 14. As will be recognized by those skilled in the art, other forms of ballasts can be used, but the lag ballast is a suitable form for the present circuit. Ballast 14 includes a primary portion 16 and a secondary portion 18, the primary portion extending from the beginning of the winding which is connected to terminal 11 to a tap 17 which is connected to terminal 10. The second portion extends from tap 17 to the finish of the winding. A super compact fluorescent lamp 20 is provided with filaments 22 and 23 within the lamp envelope. One terminal of filament 22 is connected to the finish end of the transformer and one terminal of filament 23 is connected to the start end. The lag ballast is arranged so that the voltage from the start end to the finish end is about 240 volts AC under open circuit conditions.

A pulse circuit includes a pulse transformer indicated generally at 25 and a coupling capacitor 26. In the embodiment shown, the pulse transformer has a primary portion 28 and a secondary portion 29 with an intermediate tap. The pulse transformer is in an auto-transformer form with the secondary winding having significantly more turns than the primary so that a step-up action results. The pulse transformer is connected in series circuit relationship with capacitor 26, this series circuit being connected between the remaining terminals of filaments 22 and 23.

A charging circuit also connected across these terminals of the filaments includes a radio frequency (RF) choke 30, a charging resistor 32 and a storage capacitor 34, these components being connected in series relationship with each other. A two-terminal breakdown device such as a SIDAC 36 is connected at one end to the junction between resistor 32 and capacitor 34 and at the other end to the tap between the primary and secondary portions of the pulse transformer.

Finally, a positive temperature coefficient (PTC) resistor 38 is connected in parallel circuit relationship with resistor 32 and capacitor 34 and in series with choke 30.

When the circuit is first energized, current initially flows from the ballast through filament 22, through the RF choke 30, which presents a very low impedance to the 60 hertz line voltage current, and through the series-parallel circuits including resistor 32, capacitor 34, and PTC resistor 38. However, PTC resistor 38 is selected to have a cold resistance which is significantly lower than the impedance of the circuit including resistor 32 and capacitor 34. Accordingly, substantially all of the initial current flows through PTC resistor 38. This current then flows through filament 23 and back to the source. Capacitor 26 is a relatively small value capacitor (0.01 mfd) and is chosen to present a high impedance at 60 hertz but a low impedance at the higher frequency at which starting pulses will be produced.

Since substantially all of the current is flowing through the PTC resistor, there is no current to provide a significant charge on capacitor 34. However, as this "filament preheat" current continues to flow, not only are the filaments warmed but also the PTC resistor is heated. As the PTC resistor reaches its design switching temperature, the resistance thereof rapidly increases to a high magnitude, significantly above the impedance of the resistor-capacitor parallel circuit, causing the current through the PTC resistor to drop abruptly and causing a voltage close to the open circuit voltage of the ballast to appear across the PTC element, forcing the charging of capacitor 34 through resistor 32.

When the voltage across capacitor 34 reaches the breakdown voltage of SIDAC 36, the SIDAC becomes conductive and places a voltage approximating the ballast open circuit voltage across primary 28 of pulse transformer 25, inducing a high voltage, resulting from the turns ratio of the transformer, across the secondary of the pulse transformer which is applied to the lamp, causing lamp ignition.

Each high voltage starting pulse contains approximately five millijoules of energy to provide excitation energy for the pulse transformer, circuit losses, distributed capacitance charging, and lamp ionization. The majority of this energy, placed across the lamp, induces ionization therein. The time constant of resistor 32 and capacitor 34 is adjusted to provide three to four starting pulses on each half cycle of the 60 hertz supply. Coupling capacitor 26 blocks the 60 hertz current, as mentioned before, but conducts the high frequency high voltage pulses to the lamp which now has hot filaments. Choke 30 prevents the high frequency from being loaded down by the circuit including resistor 32, capacitor 34 and PTC resistor 38, and the normal ballast impedance of choke 30 prevents the high frequency pulses from being loaded down by the parallel coils 18 and 16.

When the lamp ionizes and starts its normal operation, it draws approximately 300 milliamperes and clamps the rms voltage across it to approximately 110 volts, thereby causing the starting circuit to be disabled during normal lamp operation. However, the PTC element is maintained in its high impedance state by a trickle current which continues to flow as a result of the 110 volts across the starting circuit.

If the power should be momentarily interrupted, the voltage across ballast 14 again increases to 240 volts. Since the filaments are already warm, and since PTC resistor 38 is still in its high impedance state, capacitor 34 immediately begins to charge, reinitiating a normal restart process. If either one of filaments 22 or 23 burns out, i.e., becomes open, the high voltage starting system is automatically disabled since it is no longer supplied with power from the ballast secondary. Thus, the application of high voltage pulses to the lamp, socket and associated components is eliminated, contributing to a safer and longer life product. If desired, one or more power factor capacitors can be added to the circuit of FIG. 1. As mentioned above, the circuit can also be used with a 240 volt reactor ballast or lead type ballast, if desired.

Figure 2:
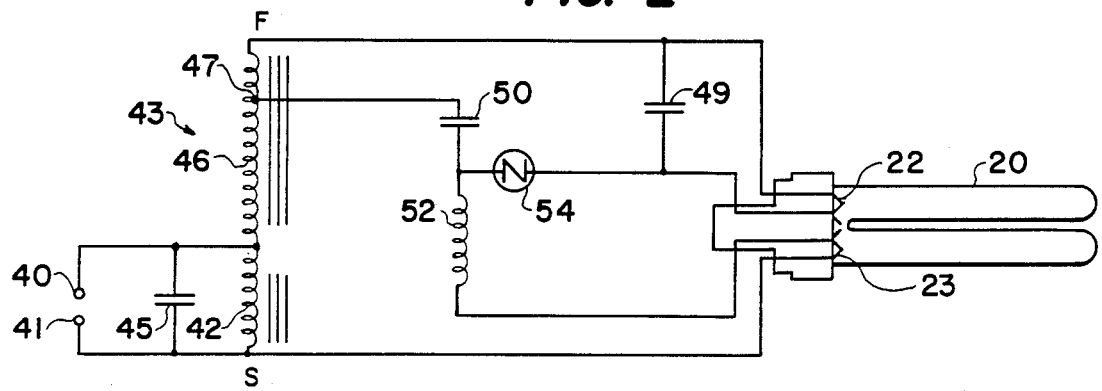
FIG. 2 is a schematic circuit diagram of a second embodiment of a starting and operating circuit in accordance with the invention.

The circuit of FIG. 2 takes a somewhat different approach to the problem and employs the ballast itself as the pulse transformer. Terminals 40 and 41 of the FIG. 2 circuit are connected to line voltage and to the primary portion 42 of a lag ballast indicated generally at 43. A power factor correction capacitor 45 is also shown connected across the primary.

Ballast 43 also has a secondary portion 46 with a tap 47 near the finish end of the winding. A lamp 20 has filaments 22 and 23, as in FIG. 1, and one terminal of filament 22 is connected through the ballast 43 to the source while one terminal of filament 23 is connected to the common end of the ballast and the common line of the source. A coupling capacitor 49 is connected between the terminals of filament 22.

A storage capacitor 50 and an RF choke 52 are connected in series circuit relationship with each other between tap 47 and the upper terminal of filament 23. A breakdown device, such as a SIDAC 54 is connected between the junction of capacitor 50 with choke 52 and the connection of capacitor 49 to filament 22, placing the SIDAC in a series circuit including capacitor 49, the tapped portion of secondary 43 between tap 47 and the finish end of the winding, and capacitor 50.

It should be noted that the value of capacitor 49 is selected so that it presents a high impedance to 60 hertz but a lower impedance to high frequency signals. Choke 52, on the other hand, presents a low impedance to 60 hertz current and a high impedance to higher frequencies.

In operation, when the ballast is energized, the open circuit voltage appears across the ballast coils, causing storage capacitor 50 to be charged as current flows from tap 47 through capacitor 50 and the RF choke and returns to the common side of the line through lamp filament 23 which presents a low impedance. When the charge across capacitor 50 reaches the breakdown level of the SIDAC, the SIDAC becomes conductive, thereby causing substantially the entire voltage on capacitor 50 across the tapped portion of the ballast secondary. By transformer action, high voltage lamp starting pulses are generated across the total secondary winding of the ballast. Because of the bypass action of capacitor 49, the high frequency pulse generated is not caused to flow directly through filament 22. In the present circuit, one starting pulse is generated each half cycle, although it would be possible to select circuit values so that more than one pulse could be generated each half cycle if required.

The high voltage starting magnitude is intentionally set at a level at which it is not sufficient to start a cold filament lamp. For a 26 watt lamp, the pulses have a peak value of about 1500 volts. Thus, the lamp does not start immediately but, rather, filament current is allowed to flow each half cycle after the SIDAC has become conductive. This heating current flows from the finish end of the ballast through filament 22, through the SIDAC, through choke 52 and through filament 23. Depending upon the initial conditions of the lamp temperature, after one or several cycles, the filaments are heated sufficiently to permit starting at a lower voltage level. Because of the fact that the high voltage lamp starting pulses are being applied along with the filament heating current, the lamp starts when thermionic cathode conditions are reached. Keeping the high voltage pulses at a low level avoids "forcing" the lamp into ionization and prevents damage to the lamp components.

After the lamp has started conduction, the starting mechanism is automatically disabled because the 240 volt open circuit voltage from the ballast is no longer available, the lamp clamping the voltage to approximately 110 volts.

Figure 3:
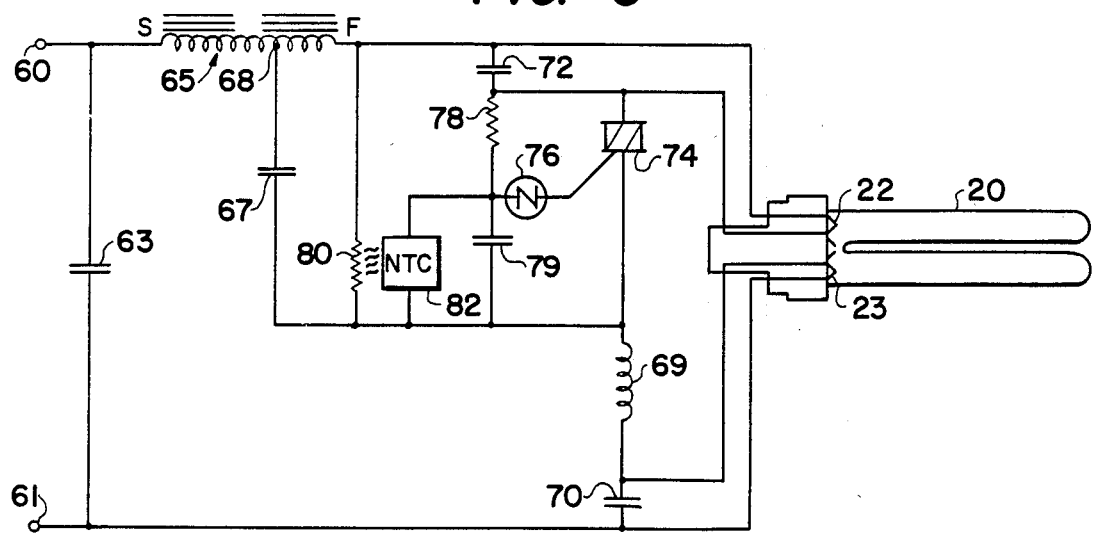
FIG. 3 is a schematic circuit diagram of a third embodiment of a starting and operating circuit in accordance with the invention.

The circuit of FIG. 3 is very similar in principle to the circuit of FIG. 2 but employs a different form of ballast and, additionally, includes a positive "turn-off" feature which functions in the event that the lamp fails in any way. As shown in FIG. 3, the line voltage which, in this case, is 240 volts, is connected to terminals 60 and 61 and a power factor correction capacitor 63 is connected between those terminals. A ballast reactor indicated generally at 65 is connected in the "hot" line between terminal 60 and one terminal of a filament 22 in lamp 20. A storage capacitor 67 is connected in series circuit relationship with an RF choke 69 between a tap 68 on ballast 65 and the common side of the power line. A small bypass capacitor 70 is connected in series with this circuit and between the terminals of filament 23 to bypass high frequency pulse energy. A bypass capacitor 72 is similarly connected between the terminals of filament 22. A three-terminal breakdown device illustrated as a triac 74 has a switchable conductive path connected between a terminal of filament 22 and the junction between capacitor 67 and choke 69. The gate of triac 74 is connected through a two-terminal breakdown device such as a diac 76. The other end of diac 76 is connected to the junction between a resistor 78 and a capacitor 79 which forms a timing circuit to positively control the breakdown of diac 76 and the firing of triac 74.

In addition, a heating resistor 80 is connected from the finish end of ballast 65 to the junction between capacitor 67 and choke 69, resistor 80 being in good heat conducting relationship with a negative temperature coefficient resistor 82 which is connected in parallel with capacitor 79.

In operation, when power is supplied, capacitor 67 begins to charge through the circuit including choke 69 and capacitor 79 charges through resistor 78 and capacitor 22. When capacitor 79 reaches the breakdown level of diac 76, the diac becomes conductive, triggering triac 74 which discharges the capacitor 67 through the tapped portion at the finish end of reactor 65, the current pulse causing, by transformer action, a pulse to be produced across the lamp. Again, the pulse is insufficient to start a cold lamp but causes current flow through filaments 22 and 23. Depending upon environmental conditions and the initial temperature of the lamp, one or several such pulses elevate the temperature of the filaments to the point at which the pulses are sufficient to initiate ionization. Thus, the circuit operation is substantially similar to that of FIG. 2. However, the incorporation of a triac (which could also be replaced by back-to-back controlled rectifiers) allows the separation of functions, higher energy pulse generation, more accurate positioning of the pulse timing, circuit feedback and also permits the incorporation of a failed lamp turn-off circuit.

The lamp turn-off circuit, including resistor 80 and NTC resistor 82, operates by heating resistor 80 after successive applications of high voltage pulses, causing sufficient current through the resistor to elevate its temperature. The heat produced by resistor 80 is conducted to NTC resistor 82, the resistance of which lowers sufficiently to prevent capacitor 79 from developing enough charge to breakdown diac 76. Thus, the starting circuit is disabled. The time constant of this circuit can be selected so that it does not come into play unless the lamp has failed and repeated starting pulses are applied to no avail.

While certain advantageous embodiments have been chosen to illustrate the invention, it will be understood by those skilled in the art that various changes and modifications can be made therein without departing from the scope of the invention as defined in the appended claims.

What is claimed is:

1. A super compact fluorescent lamp starting and operating circuit comprising the combination of a ballast connectable to a source of line voltage;

a super compact fluorescent lamp having two filaments, one terminal of each of said filaments being connected through said ballast to said source;

first circuit means including a pulse transformer having a primary portion and a secondary portion and a high frequency coupling capacitor connected to said secondary portion for providing starting pulses to said lamp, said first circuit means being connected between the other terminals of said filaments;

second circuit means including an RF choke, a charging resistor and a storage capacitor connected in series circuit relationship with each other between said other terminals of said filaments for developing a trigger voltage;

breakdown device means connected between said storage and said pulse transformer for providing a pulse to said transformer in response to said trigger voltage;

a positive temperature coefficient (PTC) resistor connected in parallel circuit relationship with the portion of said second circuit means including said charging resistor and storage capacitor, said PTC resistor having a cold resistance significantly less than the impedance of said charging resistor and storage capacitor so that, when said starting and operating circuit is first energized and current flows through said filaments, said choke and at least one of said PTC resistor and said charging resistor and storage capacitor, substantially more current flows through said PTC resistor than through said charging resistor, said PTC resistor having a warm resistance significantly greater than said charging resistor so that, when said PTC resistor and said filaments are warmed, more current flows through said charging resistor and to said capacitor, charging said capacitor and triggering said breakdown device to produce starting pulses for said lamp.

2. A super compact fluorescent lamp starting and operating circuit comprising the combination of a ballast connectable to a source of line voltage, said ballast having a primary portion and a secondary portion and said secondary portion having a tap defining a tapped portion at the output end thereof;

a super compact fluorescent lamp having first and second filaments, one terminal of said first filament being connected through said ballast to said source and one terminal of said second filament being connected to the common line of said source and said ballast;

a high frequency coupling capacitor connected across the terminals of said first filament;

circuit means including an RF choke and a storage capacitor connected in series circuit relationship with each other between said tap on said secondary portion of said ballast and the other terminal of said second filament for developing a voltage across said capacitor;

breakdown device means having a switchable conductive path connected to one end to the junction of said storage capacitor with said RF choke and at the other end in series circuit relationship with said coupling capacitor for forming a discharge circuit with said tapped portion of said ballast for conducting energy stored in said capacitor to produce a current discharge through said tapped portion, said ballast being responsive to each said current discharge to produce a pulse across said lamp, said tapped portion including a number of windings such that the voltage of the pulses is insufficient to start a cold lamp, thereby requiring that a plurality of pulses be supplied to said lamp to warm said filaments before the lamp is started.

3. A circuit according to claim 2, wherein said breakdown device means includes a two-terminal device responsive to said voltage across said storage capacitor to discharge said capacitor through said tapped portion.

4. A circuit according to claim 2 wherein said breakdown device means includes a three-terminal device having a gate electrode and a switchable conductive path; and a two-terminal device connected to said gate electrode; and timing circuit means for causing said two-terminal deice to conduct and render said three terminal device conductive.

5. A circuit according to claim 4 and further including a negative temperature coefficient (NTC) resistor in parallel with at least a portion of said timing circuit means including said storage capacitor;

a heating resistor connected in parallel circuit relationship with said storage capacitor and physically in good heat conducting relationship with said negative temperature coefficient resistor, said heating resistor being heated by successive pulses to reach a temperature at which the temperature of said NTC resistor is increased so that its resistance is decreased to the point at which said timing circuit is rendered inoperative.

* * * * *